May 6, 1969     E. L. PARR     3,443,179

RECIPROCATING MOTOR RATCHET AND PAWL REMOTE POSITION INDICATOR

Filed Oct. 18, 1965

INVENTOR.
EDWARD L. PARR
BY
FULWIDER, PATTON, RIEBER, LEE & UTECHT
ATTORNEYS

United States Patent Office 3,443,179
Patented May 6, 1969

3,443,179
RECIPROCATING MOTOR RATCHET AND PAWL REMOTE POSITION INDICATOR
Edward L. Parr, El Cajon, Calif., assignor to Wendell L. Thompson, Burbank, Calif.
Filed Oct. 18, 1965, Ser. No. 497,036
Int. Cl. G05b 1/04
U.S. Cl. 318—21                               2 Claims

ABSTRACT OF THE DISCLOSURE

An electrically actuated indicating system for indicating data from and to remotely disposed stations. The system includes indicators which can function either as masters or as slaves. Each indicator includes a manually actuated hand which turns a ratchet wheel, the teeth of which actuate a switch for controlling a motor having a reciprocating armature. The motor is pivotally mounted and the armature is biased toward the teeth of the ratchet wheel. The motors are connected in series circuit relation.

Figure 1:
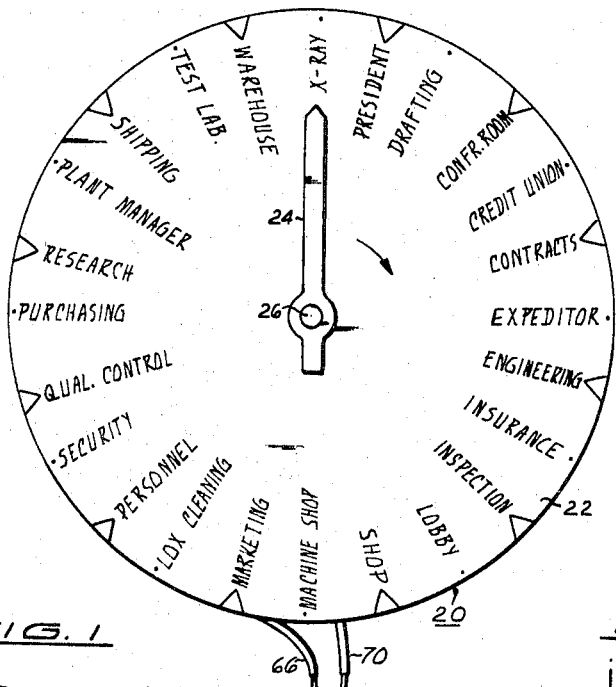

The present invention relates to an indicator system of the type which is manually controlled and includes at least two indicators for indicating data at various positions simultaneously.

One indicator functions or all of the indicators function at will either as a master indicator or a slave indicator. In the preferred embodiment, each indicator functions at will as a master indicator or as a slave indicator.

The system, in one aspect of the invention, includes a master indicator including a dial having indicia thereon, for example, names of departments in an office or factory. A manually controlled hand is movable relative to the dial to indicate a department. An actuator is moved by the hand. This actuator includes a plurality of teeth which, when moved by the hand, impart step by step opening and closing of an electric switch. This switch, upon being actuated, controls a step by step movement of an electric motor of a slave indicator. This step by step movement advances a hand on the slave indicator commensurate with the movement of the hand on the master indicator.

In the preferred embodiment, each indicator is provided with a motor and an electric switch, and all motors and switches are connected in series circuit relationship, whereby the movement of a hand of any indicator effects commensurate movement of the hands of all other indicators.

Other features and the advantages of the present invention will be apparent from the following description, reference being had to the accompanying drawing, wherein a preferred embodiment of the invention is illustrated.

IN THE DRAWING

Figure 2:
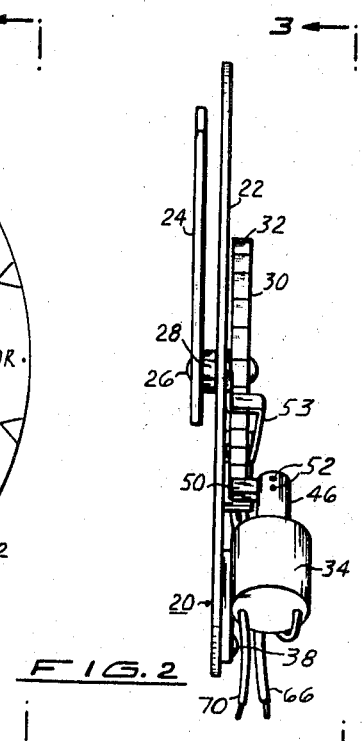
Figure 3:
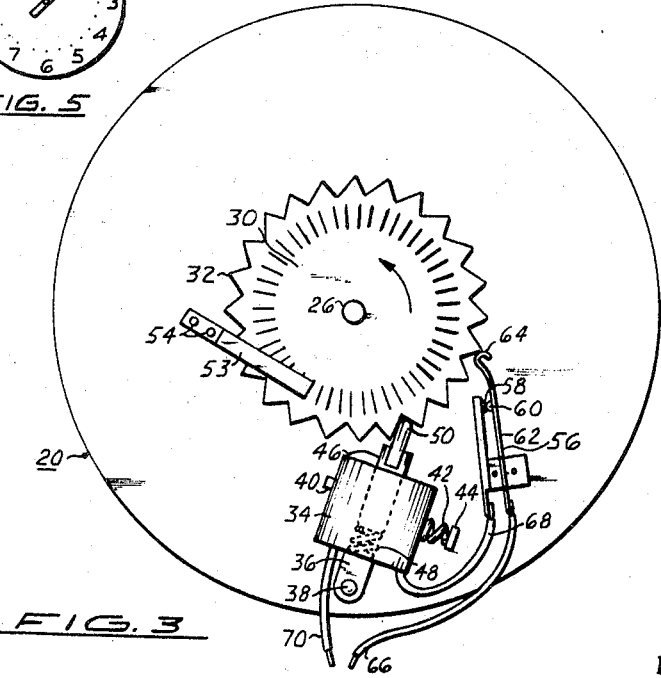
Figure 4:
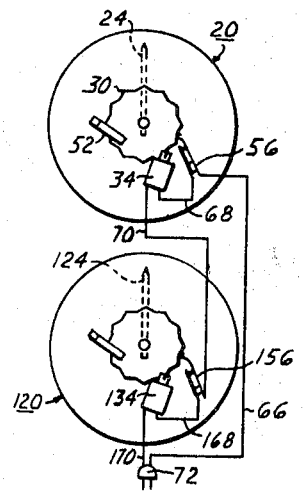

FIG. 1 is a front view of an indicator;
FIG. 2 is a side view of the indicator shown in FIG. 1, looking in the direction of arrows 2—2 of FIG. 1;
FIG. 3 is a rear view of the indicator, looking in the direction of arrows 3—3 of FIG. 2;
FIG. 4 is a diagrammatic view of two indicators showing the same connected electrically; and
FIG. 5 is a front view of an indicator in which the dial is provided with clock numerals.

Figure 5:
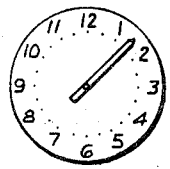

Referring more in detail to the drawing, one of the indicators is shown at 20 which includes a dial 22 having indicia thereon in the form of names of departments in a factory, as shown in FIG. 1, or the indicia may be in the form of clock numerals as shown in FIG. 5. A manually controlled hand 24 is fixed to a shaft 26, which is suitably carried by a bearing 28, sufficient friction being maintained between the shaft and the bearing 28 so that when the hand is moved to a position, it is retained there frictionally. An element in the form of a ratchet wheel 30, having teeth 32, is also fixed to the shaft 26 and is disposed on the rear side walls of the dial 22. In the embodiment illustrated, twenty-four teeth are provided on the ratchet wheel 30 for the purpose of indicating twenty-four shop or factory departments or offices, and also, as shown in FIG. 5, for indicating each of the hours and the half hours.

The rear of the dial carries an electric motor in the form of a solenoid 34. The solenoid is carried by an arm 36 which is pivotally mounted on a pin 38. As viewed in FIG. 3, the solenoid 34 is biased toward a stop 40 by a spring 42 which is interposed between the solenoid and and abutment 44. The armature 46 of the solenoid is normally biased outwardly by a spring 48 but when the solenoid is energized, the armature 46 is moved downwardly, as viewed in FIG. 3. A blade 50 is fixed by pins 52 to the solenoid armature 46 and is arranged to engage, progressively, the teeth 32 on the ratchet wheel 30. The armature is shown as retracted in FIG. 3, the solenoid being electrically energized at that time. Upon deenergization of the solenoid, the spring 48 will force the armature 46 and the blade 50 upwardly to advance the ratchet wheel one step, i.e., one tooth forwardly in a counterclockwise direction, as viewed in FIG. 3. A leaf spring 53 is fixed to the rear of the dial 22 by rivets 54. This leaf spring bears upon the outer surface of the ratchet wheel 30 to prevent abnormal movement of the ratchet wheel.

A switch 56 controls the solenoid 34; it includes a stationary contact 58 which is suitably fixed to the rear of the dial 22. A movable contact 60 is carried by a leaf spring 62 which leaf spring normally biases the contact 60 into contact relationship with the contact 58. The outer end 64 of the leaf spring 62 is curved and is adapted to be engaged by the teeth 32 of the ratchet wheel 30. Upon movement of the ratchet wheel 30 by the hand 24, contact 60 will be separated from contact 58 to interrupt the circuit to the solenoid 34. The switch 56, provided by the contacts 58 and 60, is connected in series circuit relation with the solenoid 34 by wires 66, switch contacts 60 and 58, solenoid 34, wire 68 and wire 70.

As previously set forth, an indicator may function solely as a master indicator or as either a master indicator or slave indicator. If, for example, it is to function merely as a master indicator, the solenoid and its function is omitted but the switch 56 is maintained; this switch would be connected in series circuit relationship with the solenoid of a slave indicator which solenoid would be actuated step by step in response to the opening and closing of the switch 56 on the master indicator. For example, if the hand was moved from the position of "President" to "Engineering," the switch 56 would function six times causing the hands of the slave indicator to move six steps, namely, to corresponding data on the slave indicator which would be "Engineering."

However, in the preferred embodiment, the indicating system is of the type in which each indicator functions as a master indicator or as a slave indicator.

Referring now to FIG. 4, it will be seen that the solenoid 34 and the switch 56 are connected in series circuit relationship with a switch 156 and a solenoid 134 of an indicator 120. The circuit may be traced as follows: Wire 66, which is connected by a plug 72 to a source of current, switch 56, wire 68, solenoid 34, wire 70, switch 156, wire 168, solenoid 134 and wire 170 to the plug 72. Thus, it will be seen that actuation of hand 24 of indicator 20 will effect the step by step movement of the armature of the solenoid 134 to advance the hand 124 of indicator 120. Likewise, the movement of the hand 124 of indicator 120 will cause a comprehensive movement of the hand 24 of indicator 20.

The solenoid 34, and likewise the solenoid 134, is pivotally mounted as previously described for the purpose of permitting the advancing which will permit the tooth following that tooth which is being engaged by the blade 50 to advance, since said following tooth will move the solenoid in a clockwise direction, as viewed in FIG. 3.

The same system can be used for indicating, for example, when a party is expected to return to his office, for example, in FIG. 5, the indication is that the man will return to his office at 1:30 and all of the indicators which are connected in a series will show the same time.

It is to be understood that while only two indicators, 20 and 120, are shown, as many as desirable may be connected in series circuit relationship.

While the form of embodiment herein shown and described, constitutes preferred form, it is to be understood that other forms may be adopted falling within the scope of the claims that follow.

I claim:
1. An indicating system, comprising in combination:
   (A) two indicators, each including:
      (1) a dial having indicia thereon;
      (2) a manually controlled hand movable relative to the dial and the indicia;
      (3) an element connected with and movable with the hand, said element having a plurality of teeth;
      (4) an electric switch associated with the teeth of said element;
      (5) an electric motor connected in series with the switch;
      (6) a pivot;
   said motor being of the type having a reciprocating armature, said motor being pivotally carried by the pivot with the armature biased toward the teeth on the element;
   (B) an electric circuit including both motors and both switches, said motors and switches being connected in series circuit relationship.

2. An indicating system as defined in claim 1, characterized in that the indicator includes:
   (7) a spring normally biasing the reciprocating armatures of the motor toward the teeth.

References Cited

UNITED STATES PATENTS

| | | | |
|---|---|---|---|
| 740,261 | 9/1903 | Fessenden | 318—21 X |
| 1,787,620 | 1/1931 | Favarger | 310—49 X |
| 2,683,841 | 7/1954 | Rogers | 310—23 X |

FOREIGN PATENTS

| | | |
|---|---|---|
| 257,951 | 1/1912 | Germany. |

ORIS L. RADER, *Primary Examiner.*

T. E. LYNCH, *Assistant Examiner.*

U.S. Cl. X.R.

310—23, 49